(12) United States Patent
Suda et al.

(10) Patent No.: US 10,500,947 B2
(45) Date of Patent: Dec. 10, 2019

(54) FUEL SUPPLY DEVICE

(71) Applicant: TOYODA GOSEI CO., LTD., Kiyosu-shi, Aichi-ken (JP)

(72) Inventors: Masahiro Suda, Kiyosu (JP); Keiji Miyoshi, Kiyosu (JP); Shintaro Nonaka, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 46 days.

(21) Appl. No.: 15/882,027

(22) Filed: Jan. 29, 2018

(65) Prior Publication Data
US 2018/0229599 A1    Aug. 16, 2018

(30) Foreign Application Priority Data
Feb. 16, 2017    (JP) .................................. 2017-026804

(51) Int. Cl.
*B60K 15/035*    (2006.01)
*B60K 15/04*    (2006.01)
(Continued)

(52) U.S. Cl.
CPC ...... *B60K 15/03504* (2013.01); *B60K 15/035* (2013.01); *B60K 15/04* (2013.01);
(Continued)

(58) Field of Classification Search
CPC ..................... B60K 15/03504; B60K 15/035; B60K 15/04; B60K 2015/047; B60K 2015/0458; B60K 2015/0477; B60K 2015/0461
See application file for complete search history.

(56) References Cited

U.S. PATENT DOCUMENTS 4,635,813 A * 1/1987 Peickert ................. B60K 15/04
138/40
5,056,570 A * 10/1991 Harris .............. B60K 15/03519
141/302
(Continued)

FOREIGN PATENT DOCUMENTS

| JP | 2009-083569 A | 4/2009 |
| JP | 4894701 B2 | 1/2012 |
| JP | 2017-001660 A | 1/2017 |

*Primary Examiner* — Timothy P. Kelly
(74) *Attorney, Agent, or Firm* — Posz Law Group, PLC

(57) ABSTRACT

A fuel supply device (FS) includes a filler neck (10) that includes a nozzle guiding path that guides a fuel supply nozzle (FN), and a fuel passage that is continuous to the nozzle guiding path on a downstream side of the fuel passage, through which fuel that has been discharged from the fuel supply nozzle (FN) passes; a fuel vapor port (23) located outside of the filler neck (10) that has a through hole (23H) that communicates with the fuel passage (11Pd); and a vapor introduction body (70) that guides the fuel vapor from the fuel vapor port to the fuel passage (11Pd). The vapor introduction body (70) includes a within-through-hole support (71) that is inserted into and held in the through hole (23H), and includes a vapor passage (71a) along the through hole (23H), and a changing member (72) that faces an opening of the vapor passage (71a) on a side of the fuel passage (11Pd), and is configured to change a direction of flow of the fuel vapor that passes through the vapor passage (71a) to the side of the fuel passage (71a). The vicinity of the fuel vapor port in the filler neck is configured compactly.

7 Claims, 10 Drawing Sheets

(51) Int. Cl.
 *B67D 7/42* (2010.01)
 *B67D 7/04* (2010.01)
(52) U.S. Cl.
 CPC ............... *B60K 2015/03523* (2013.01); *B60K 2015/03538* (2013.01); *B60K 2015/03576* (2013.01); *B60K 2015/0458* (2013.01); *B60K 2015/0461* (2013.01); *B60K 2015/0477* (2013.01); *B67D 7/04* (2013.01); *B67D 7/42* (2013.01); *Y02T 10/123* (2013.01)

(56) References Cited

U.S. PATENT DOCUMENTS

| | | |
|---|---|---|
| 8,459,237 B2 | 6/2013 | Erdmann et al. |
| 2009/0084464 A1 | 4/2009 | Hagano |
| 2016/0361993 A1 | 12/2016 | Kito et al. |

\* cited by examiner

A-A CROSS SECTION

B-B CROSS SECTION

A-A CROSS SECTION

US 10,500,947 B2

FUEL SUPPLY DEVICE

CROSS-REFERENCE TO RELATED APPLICATION

The present application claims priority from Japanese application P2017-26804 filed on Feb. 16, 2017, the content of which is hereby incorporated by reference into this application.

BACKGROUND

1. Field

This disclosure relates to a fuel supply device.

2. Related Art

A fuel supply device that is equipped in a vehicle includes a fuel vapor pipe that connects a tank and a filler neck with one another to stop the pressure inside a fuel tank from excess increasing. In this kind of fuel supply device, fuel vapor is exhausted to the filler neck via a fuel vapor pipe, and sent to the fuel tank via a fuel passage together with fuel by negative pressure that is generated by the fuel supplied to the tank. As a way to promote sending the fuel vapor to the tank, there has been proposed a method of guiding the fuel vapor to the fuel passage from a fuel vapor port, to which a fuel vapor pipe is connected. (see, for example, Japanese Unexamined Patent Application Publication No. 2009-83569).

SUMMARY

Japanese Unexamined Patent Application Publication No. 2009-83569, a nozzle guide that guides a fuel supply nozzle is provided with a vapor passage forming portion, and this vapor passage forming portion guides the fuel vapor to the fuel path. With this kind of nozzle guide, the shape of the nozzle guiding path that guides the fuel supply nozzle needs to be maintained, and providing the vapor passage forming portion results in a complicated nozzle guide shape. Having a complicated shape can result in increased size of the components surrounding the nozzle guide. In recent years, it has been desired that components surrounding the fuel vapor port in a filler neck be compact due to rising demand to make vehicles themselves more compact.

This disclosure has been made in order to at least partially solve the above-mentioned problems, and may be implemented as the following aspects.

(1) According to one aspect of this disclosure, there is provided a fuel supply device. The fuel supply device includes a filler neck that includes a nozzle guiding path that guides a fuel supply nozzle, and a fuel passage that is continuous to the nozzle guiding path on a downstream side of the fuel passage, and through which fuel that has been discharged from the fuel supply nozzle passes; a fuel vapor port that is provided outside of the filler neck that has a through hole that communicates with the fuel passage; and a vapor introduction body that guides the fuel vapor from the fuel vapor port to the fuel passage. In addition, the vapor introduction body includes a within-through-hole support that is inserted into and supported by the through hole, and includes a vapor passage along the through hole; and a changing member that faces an opening of the vapor passage on a side of the fuel passage, and is configured to change the direction of flow of the fuel vapor that passes through the vapor passage to the side of the fuel passage.

In the fuel supply device according to this aspect, the fuel vapor is guided to the fuel passage by merely inserting the vapor introduction body, which includes the within-through-hole support and the changing member, into the through hole in the fuel vapor port. Therefore, there is no need to change the shape of the site where the nozzle guiding path is formed. As a result, with the fuel supply device according to this aspect, it is possible to reduce the size of the area around the fuel vapor port in the filler neck.

(2) In the fuel supply device according to the aspect described above, the vapor introduction body may be configured such that the within-through-hole support and the changing member are formed integrally. With this configuration, it is even easier to insert the vapor introduction body into the through hole of the fuel vapor port.

(3) In the fuel supply device according to the aspect described above, the within-through-hole support may be rotatable about a through hole axis in the through hole. This makes it possible to change the direction of flow of the fuel vapor when the fuel vapor is guided to the fuel passage to a direction about the through hole axis, and thereby correctly introduce the fuel vapor to the fuel passage by changing the direction of flow of the fuel vapor. Further, this successful introduction is achieved by the vapor introduction body merely rotating about the through hole axis, and hence successful introduction of the fuel vapor can be achieved with a simple operation.

(4) In the fuel supply device according to the aspect described above, the changing member may change the direction of flow of the fuel vapor to at least two directions. This makes it possible to introduce the fuel vapor to the fuel passage from various directions.

DESCRIPTION OF THE EMBODIMENTS

Figure 1:
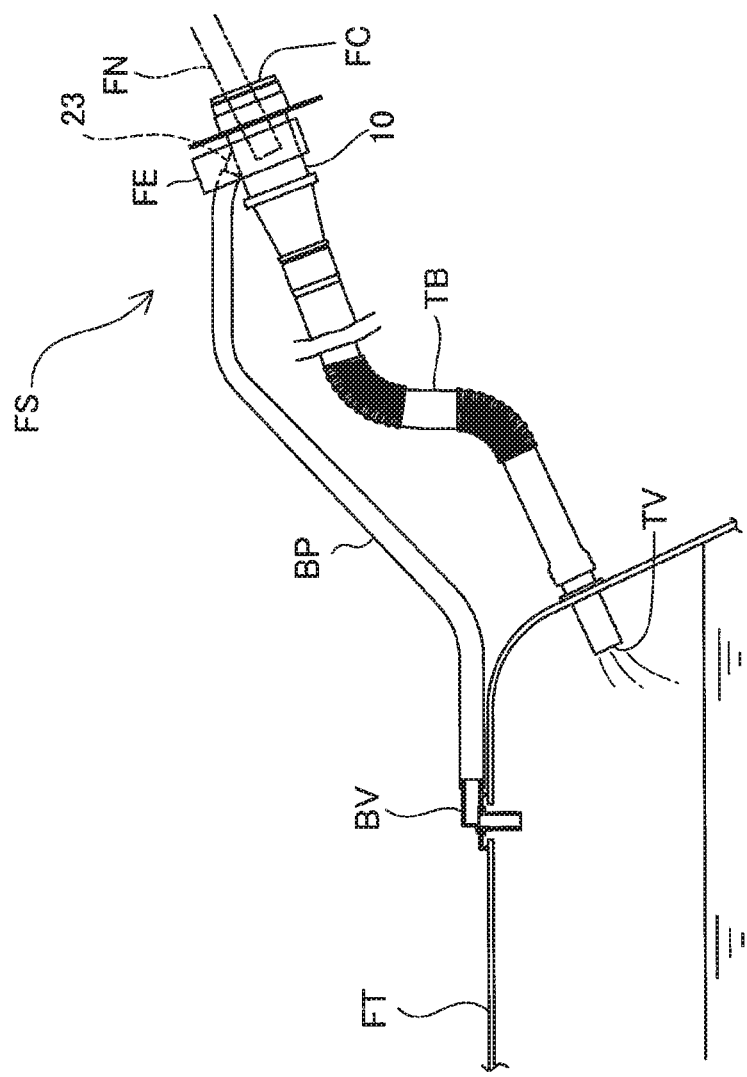
FIG. 1 is an explanatory diagram for illustrating an overview of a fuel supply device according to an embodiment, in which fuel that is supplied from a fuel supply nozzle is guided to a fuel tank in a vehicle.

FIG. 1 is an explanatory diagram for illustrating an overview of a fuel supply device FS according to an embodiment, in which fuel that is supplied from a fuel supply nozzle FN is guided to a fuel tank FT in a vehicle. The fuel supply device FS includes a filler neck 10, a fuel vapor port 23, a filler tube TB, a check valve TV, a fuel vapor pipe BP, a gas release control valve BV, and a mounting member FE. The filler neck 10 is fixed to a fuel supply portion (not shown) in a vehicle by the mounting member FE, and is configured to accept insertion of the fuel supply nozzle FN to a fuel supply port FC. The filler neck 10 is connected to the fuel tank FT via the filler tube TB and the fuel vapor pipe BP. The filler tube TB is, for example, a resin tube that has a bellows structure in two places, and can extend and contract and bend in a certain range. The filler tube TB is connected to the fuel tank FT via the check valve TV. Fuel that is discharged from the fuel supply nozzle FN that is inserted into the fuel supply port FC is supplied to the fuel tank FT via a fuel passage, which is to be described later, that is formed by the filler neck 10, and the filler tube TB and the check valve TV. The check valve TV prevents the fuel from flowing back into the filler tube TB from the fuel tank FT.

One end of the fuel vapor pipe BP is connected to the fuel tank FT via the gas release control valve BV. The other end of the fuel vapor pipe BP is connected to the fuel vapor port 23 that protrudes out from the filler neck 10. The gas release control valve BV is a check valve that opens and closes based on pressure inside the fuel tank FT, and closes when the internal pressure of the fuel tank FT is equal to or less than a predetermined value to prevent air from circulating to the filler neck 10 from the fuel tank FT. When the internal pressure of the fuel tank FT becomes more than the predetermined value, the gas release control valve BY opens, and air is circulated from the fuel tank FT to the filler neck 10. The air inside the tank includes the fuel vapor, and this fuel vapor is guided to the fuel tank FT along the filler tube TB together with the supplied fuel when the fuel is supplied from the fuel supply nozzle FN. This operation of the gas release control valve BY maintains the internal pressure of the fuel tank FT at a predetermined pressure. The configurations of important elements of the fuel supply device FS are described in detail below.

Figure 2:
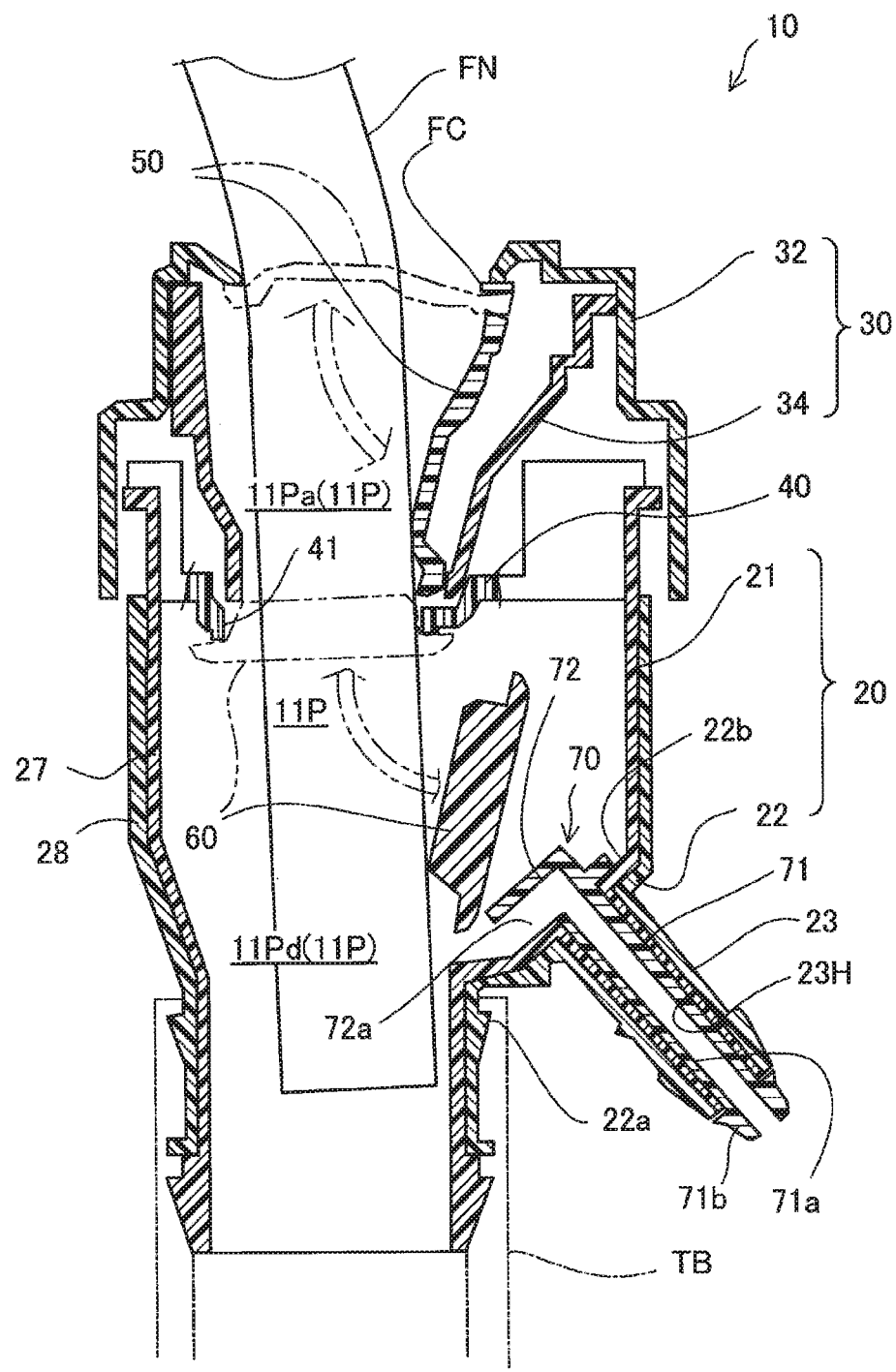
FIG. 2 is an explanatory diagram for illustrating a filler neck receiving supply of fuel from the fuel supply nozzle as viewed in cross-section in a longitudinal direction.

FIG. 2 is an explanatory diagram for illustrating the filler neck 10 receiving supply of the fuel train the fuel supply nozzle FN as viewed in cross-section in a longitudinal direction. As illustrated in FIG. 2, the filler neck 10 includes a neck body 20, a nozzle guiding path member group 30, an injection port member group 40, a fuel supply port opener/closer 50, and an injection port opener/closer 60.

The neck body 20 includes, from an upstream side of a fuel passage 11P, a neck upper end portion 21, and a neck connecting portion 22. The fuel vapor port 23 is formed facing outward from the neck connecting portion 22. The neck upper end portion 21 is a passage forming member that forms the fuel passage 11P, which communicates with the fuel supply port FC. The nozzle guiding path member group 30, which is to be described later, is assembled on an upper end of the neck upper end portion 21, The fuel supply port FC is provided with the fuel supply port opener/closer 50, which is to be described later, and is usually closed due to the fuel supply port opener/closer 50. The fuel supply port FC appears when the fuel supply port opener/closer 50 is opened by the fuel supply nozzle FN. The neck connecting portion 22 has a shape that extends below the neck upper end portion 21 while reducing in diameter, and forms a lower end passage 11Pd of the fuel passage 11P. The filler tube TB (see FIG. 1), which is provided to supply the fuel, is connected to the lower end passage 11Pd. To facilitate connection between the lower end passage 11Pd and the filler tube TB, the neck connecting portion 22 is a so-called "fir tree" that has a plurality of cyclical protrusions 22a along an outer peripheral edge on a lower end side. The lower end passage 11Pd formed by the neck connecting portion 22 continues to a passage downstream side of an upstream passage 11Pa in the fuel passage 11P. By inserting the filler tube TB into the neck connecting portion 22, the filler tube TB becomes connected to the neck connecting portion 22 while being stopped by the cyclical protrusions 22a. The neck connecting portion 22 is continuous with the neck upper end portion 21 so that an inclined surface of the neck connecting portion 22 on the right end side in FIG. 2 increases. A part of this large inclined surface area is used as a mounting site 22b of a vapor introduction body 70, which is to be described later.

The fuel vapor port 23 is a tube that branches off and protrudes from an inclined wall of the neck connecting portion 22, and has a through hole 23H that communicates with the fuel passage 11P. As illustrated in FIG. 1, the fuel vapor pipe BP that extends from the fuel tank FT is connected to the fuel vapor port 23. Fuel vapor that has passed through the fuel vapor pipe BP is guided to the fuel passage 11P by the vapor introduction body 70, which is to be described later, that is incorporated into the fuel vapor port 23.

The neck body 20 includes the neck upper end portion 21, and the neck connecting portion 22 and the fuel vapor port 23, and is formed by stacking two types of resin materials on top of each other. More specifically, as illustrated in FIG. 2, the neck body 20 includes an inner resin layer 27 on the fuel passage 11P side, and an outer resin layer 28 that is mounted onto the outer surface of the inner resin layer 27. The inner resin layer 27 is formed of a resin material that has good resistance to fuel permeability, for example, a polyamide (PA) such as nylon, or an ethylene vinyl alcohol (EVOH), and mainly acts as a barrier layer that suppresses the permeability of fuel. The outer resin layer 28 is formed of a resin material that has good mechanical strength, for example polyethylene (PE), and mainly acts as a layer that ensures the neck body 20 has mechanical strength and shock resistance. When polyethylene is used for the outer resin layer 28, a resin material modified with maleic acid as its polar functional group (modified polyethylene) can be used. This modified polyethylene adheres to the inner resin layer 27 by being bonded with PA through chemical bonding.

The nozzle guiding path member group 30 includes a cover member 32 and an inner wall member 34. The cover member 32 is mounted to an upper portion of the neck body 20, and the fuel supply port FC is formed on an upper end of the cover member 32. The inner wall member 34 forms the upstream passage 11Pa of the fuel passage HP that continues to the fuel supply port FC. The upstream passage 11Pa serves as a nozzle guiding path that guides the inserted fuel supply nozzle FN from the fuel supply port FC. The inner wall portion 34 includes the fuel supply port opener/closer 50, and is configured to hold the fuel supply port opener/closer 50 with a bearing and a spring (not shown). The spring biases the fuel supply port opener/closer 50 toward a close direction of the fuel supply port FC. As a result, the fuel supply port opener/closer 50 rotates in the direction of the arrow illustrated in FIG. 2 by being pushed by a tip of the fuel supply nozzle FN, to thereby open the fuel supply port FC.

The injection port member group 40 is a resin molded article that is welded to the inner resin layer 27 in the neck body 20, and supports the injection port opener/closer 60 that opens/closes an injection port 41 with the fuel supply nozzle FN. The injection port opener/closer 60 is a valve with a built-in positive pressure valve, and includes a gasket (not shown) that comes into contact with an opening edge of the injection port 41. The injection port opener/closer 60 is rotatably held by a bearing (not shown), and is subjected to biasing force of the spring (not shown) in a closing direction of the injection port 41. Therefore, the injection port opener/closer 60 is pushed by the tip of the fuel supply nozzle FN that has passed through the upstream passage 11Pa, and thereby rotates in the direction of the arrow illustrated in FIG. 2 to open the injection port 41. The injection port opener/closer 60 has a built-in positive pressure valve (not shown). This positive pressure valve is a valve that opens when the internal pressure of the fuel tank exceeds a predetermined pressure to let out the pressure on the fuel tank side. Movement toward the opening direction of the injection port opener/closer 60 is restricted by a stopper (not shown) that protrudes from the inner resin layer 27 in the neck connecting portion 22.

Figure 3:
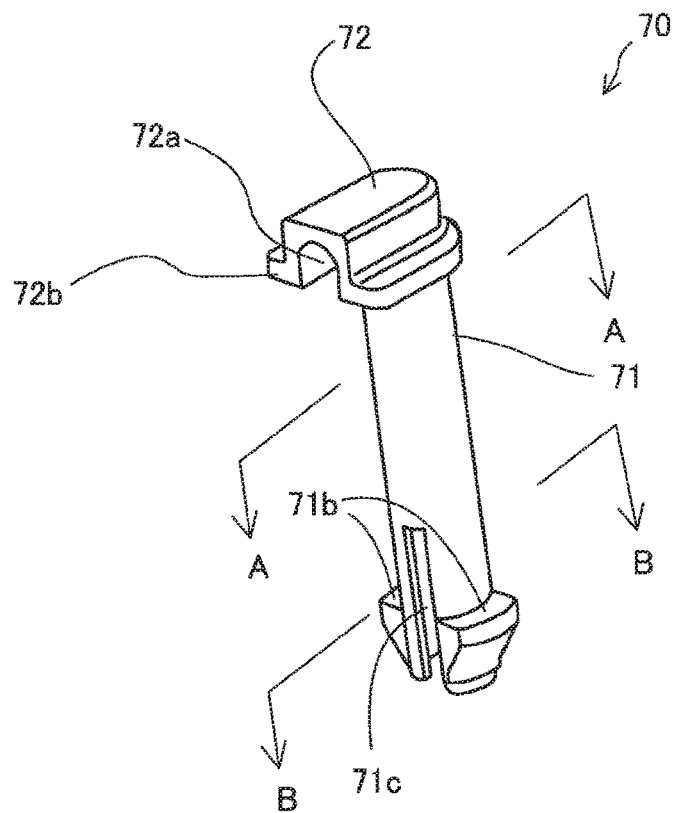
FIG. 3 is a schematic perspective view for illustrating a vapor introduction body.
Figure 3A:
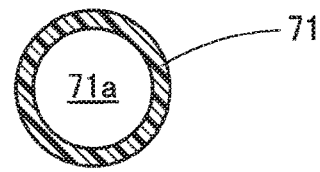
FIG. 3A and FIG. 3B are end views illustrating cross sections at various sites in enlarged manners.
Figure 3B:
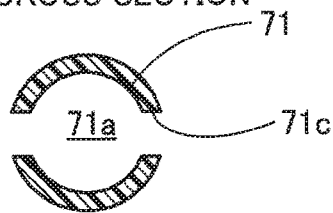

Next, the vapor introduction body 70 is described. FIG. 3 is a schematic perspective view illustrating the vapor introduction body 70, and FIGS. 3A and 3B are end views illustrating cross sections of various sites in an enlarged manner.

The vapor introduction body 70 is a stand-alone member that is incorporated into and mounted to the through hole 23H of the fuel vapor port 23, and is a molded resin article similar to the inner resin layer 27 of the neck body 20. The vapor introduction body 70 includes a tubular within-through-hole support 71, and a changing member 72 is integrally provided on an upper edge of the within-through-hole support 71. The outer diameter of the within-through-hole support 71 is smaller than the diameter of the through hole 23H of the fuel vapor port 23. Therefore, the within-through-hole support 71 is rotatable about the through hole axis in the through hole 23H while inserted within the through hole 23H. The within-through-hole support 71 includes a vapor passage 71*a* along the through hole 23H, and an engagement hook 71*b* and slits 71*c* on a lower end side of the within-through-hole support 71. The slits 71*c* are cut out of the outer wall of the within-through-hole support 71 on both sides of the vapor passage 71*a*. Therefore, the engagement hook 71*b* can elastically deform to decrease the width of the slits 71*c*. The changing member 72 faces an opening of the vapor passage 71*a* of the within-through-hole support 71, and includes a discharge-side vapor passage 72*a* in which a groove shape is formed, and a base plate 72*b* shaped as a flange that protrudes outward from an edge of the groove shape of the discharge-side vapor passage 72. By mounting the base plate 72*b* onto the mounting site 22*b*, the discharge-side vapor passage 72*a* becomes a tubular passage, and continues to the vapor passage 71*a*.

When the vapor introduction body 70 is inserted into the through hole 23H of the fuel vapor port 23 from the engagement hook 71*b* side, the engagement hook 71*b* elastically deforms inwardly, and, as illustrated in FIG. 2, passes through the through hole 23H, and then comes out through the through hole 23H to engage with the tip of the fuel vapor port 23. Due to this configuration, the vapor introduction body 70 is held by being inserted into the through hole 23H. In addition, the changing member 72 faces the opening of the vapor passage 71*a* on the fuel passage UP side in the hold state described above, and the direction of flow of the fuel vapor that has passed through the vapor passage. 71*a* changes to the fuel passage 11P side, which the discharge-side vapor passage 72*a* faces. In the present embodiment, the direction of flow of the fuel vapor changes to a direction perpendicular to the vapor passage 71*a*. Because of this, the vapor introduction body 70 guides the fuel vapor from the fuel vapor port 23 to the fuel passage 11P.

When manufacturing the fuel supply device FS, first, the neck body 20, the nozzle guiding path member group 30, and the injection port member group 40 are manufactured by injection molding, and the vapor introduction body 70 is manufactured separately by die molding or the like. The neck body 20 can be obtained by two-color molding with two different types of resin materials because the neck body 20 is formed by stacking the inner resin layer 27 and the outer resin layer 28. Then, the vapor introduction body 70 is inserted into the through hole 23H of the fuel vapor port 23 in the neck connecting portion 22. After that, the injection port member group 40 is bonded to the neck body 20 by laser welding to integrate the two components. Next, the fuel supply port opener/closer 50 is mounted to the cover member 32 of the nozzle guiding path member group 30, and the injection port opener/closer 60 is mounted to the injection port member group 40. Then, the cover member 32 to which the fuel supply port opener/closer 50 has been mounted is mounted to and engages with the neck body 20. The filler neck 10 illustrated in FIG. 2 can be obtained by forming the components in this way. The filler neck 10 obtained as described above is mounted using the mounting member FE so that the fuel supply port opener/closer 50 in the nozzle guiding path member group 30 is exposed to a fuel supply chamber (not shown).

The fuel supply device FS according to the present embodiment described above includes the vapor introduction body 70, which integrally includes the within-through-hole support 71 and the changing member 72, inserted into the through hole 23H of the fuel vapor port 23. The fuel vapor that has reached the fuel vapor port 23 from the fuel tank FT via the fuel vapor pipe BP is guided to the fuel passage 11P via the vapor passage 71*a* and the discharge-side vapor passage 72*a* of the vapor introduction body 70. As a result, in the fuel supply device FS according to the present embodiment, the shape of the nozzle guiding path member group 30, which is a member that forms the upstream passage 11Pa, does not need to be changed, which makes it possible to downsize the area around the fuel vapor port 23 in the filler neck 10. Even when the inner wall member 34 of the nozzle guiding path member group 30 forms the nozzle guiding path up until the region of the lower end passage 11Pd without the filler neck 10 including the injection port member group 40 and the injection port opener/closer 60, the shape of the nozzle, guiding path member group 30 still does not need to be changed.

Figure 4:
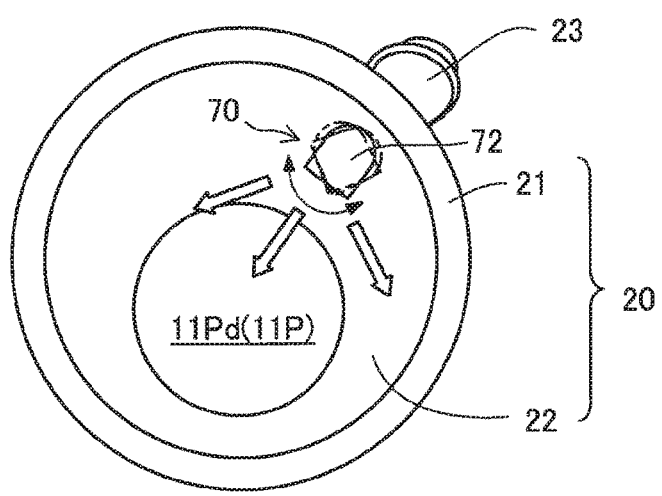
FIG. 4 is an explanatory diagram for illustrating an effect of the vapor introduction body included in the fuel supply device according to the embodiment.

In the fuel supply device FS according to the present embodiment, the vapor introduction body 70 that is mounted onto the fuel vapor port 23 is rotatable about the through hole axis in the through hole 23H. This brings about the following advantages. FIG. 4 is an explanatory diagram for illustrating an effect of the vapor introduction body 70 included in the fuel supply device FS according to the present embodiment. The vapor introduction body 70 rotates about the axis of the through hole 23H, and hence the direction of flow of the fuel vapor when the fuel vapor is guided from the vapor introduction body 70, more specifically, from the changing member 72 to the fuel passage 11P can be easily changed to many different direction, such as those indicated by the arrows filled with white ink in FIG. 4. Further, the direction of flow of the fuel vapor can be set based on the shape or size of the filler neck 10, or the length or diameter of the fuel passage 11P. In order to secure the direction of flow set in this way with the assembled state of the vapor introduction body 70, the base plate 72b should be restricted about the axis of the through hole 23H by the mounting site 22b to which the vapor introduction body 70 is mounted. With this configuration, the fuel supply device FS according to the present embodiment can successfully introduce the fuel vapor to the fuel passage 11P by changing the direction of flow of the fuel vapor. In addition, this successful introduction is achieved by the vapor introduction body 70 merely rotating about the through hole axis, and hence successful introduction of the fuel vapor can be achieved with a simple operation.

Figure 5:
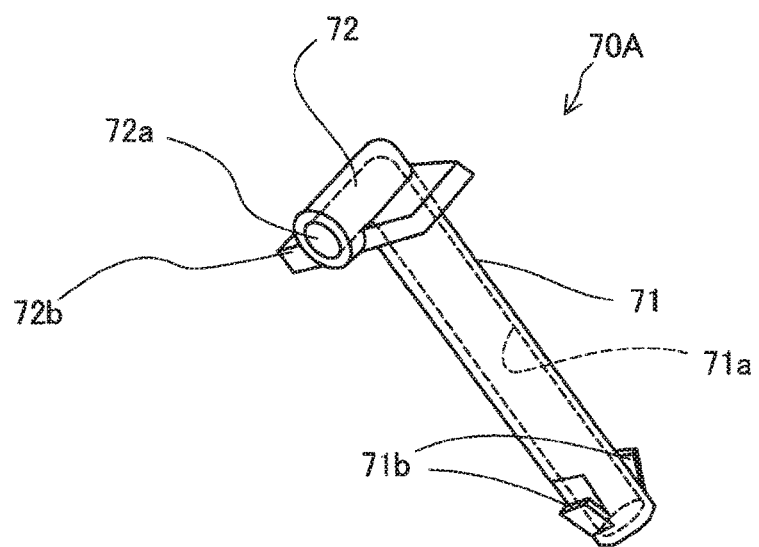
FIG. 5 is a schematic perspective diagram for illustrating a vapor introduction body according to a first modification.

FIG. 5 is a schematic perspective view of a vapor introduction body 70A according to a first modification. The vapor introduction body 70A according to this modification includes the within-through-hole support 71 and the changing member 72 as an integral bent tubular shape. In this modification, the engagement hook 71b is a plate-like shape with one side protruding from a lower end of the within-through-hole support 71. A fuel supply device FS including the vapor introduction body 70A according to this modification incorporated into the fuel vapor port 23 of the filler neck 10 illustrated in FIG. 2 can achieve the same effects as those described above. In the vapor introduction body 70A, long, hole-shaped openings may be formed in a passage axis direction of the vapor passage 71a on the peripheral wall of the within-through-hole support 71 about the passage axis at equal pitches. The long, hole-shaped openings formed in the passage axis direction of the vapor passage 71a may be formed in the vapor introduction body 70 illustrated in FIG. 3, or the vapor introduction body 70 according to a modification to be described below, or the like.

Figure 6:
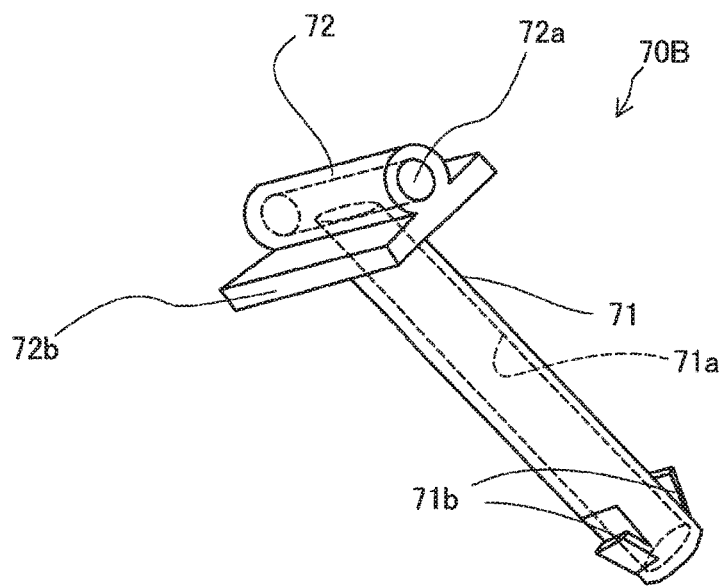
FIG. 6 is a schematic perspective diagram for illustrating a vapor introduction body according to a second modification.

FIG. 6 is a schematic perspective diagram of a vapor introduction body 70B according to a second modification. The vapor introduction body 70B according to this modification has the changing member 72 as a linear duct integrally provided on an upper end of the within-through-hole support 71. A fuel supply device FS including the vapor introduction body 70B according to this modification incorporated into the fuel vapor port 23 of the filler neck 10 illustrated in FIG. 2 can achieve the same effects as those described above. In the vapor introduction body 70B, the direction of flow of the fuel vapor that has reached the fuel vapor port 23 from the fuel tank FT via the fuel vapor pipe BP changes in the fuel passage 11P, and the fuel vapor can be introduced from two discharge-side vapor passages 72a in different directions.

Figure 7:
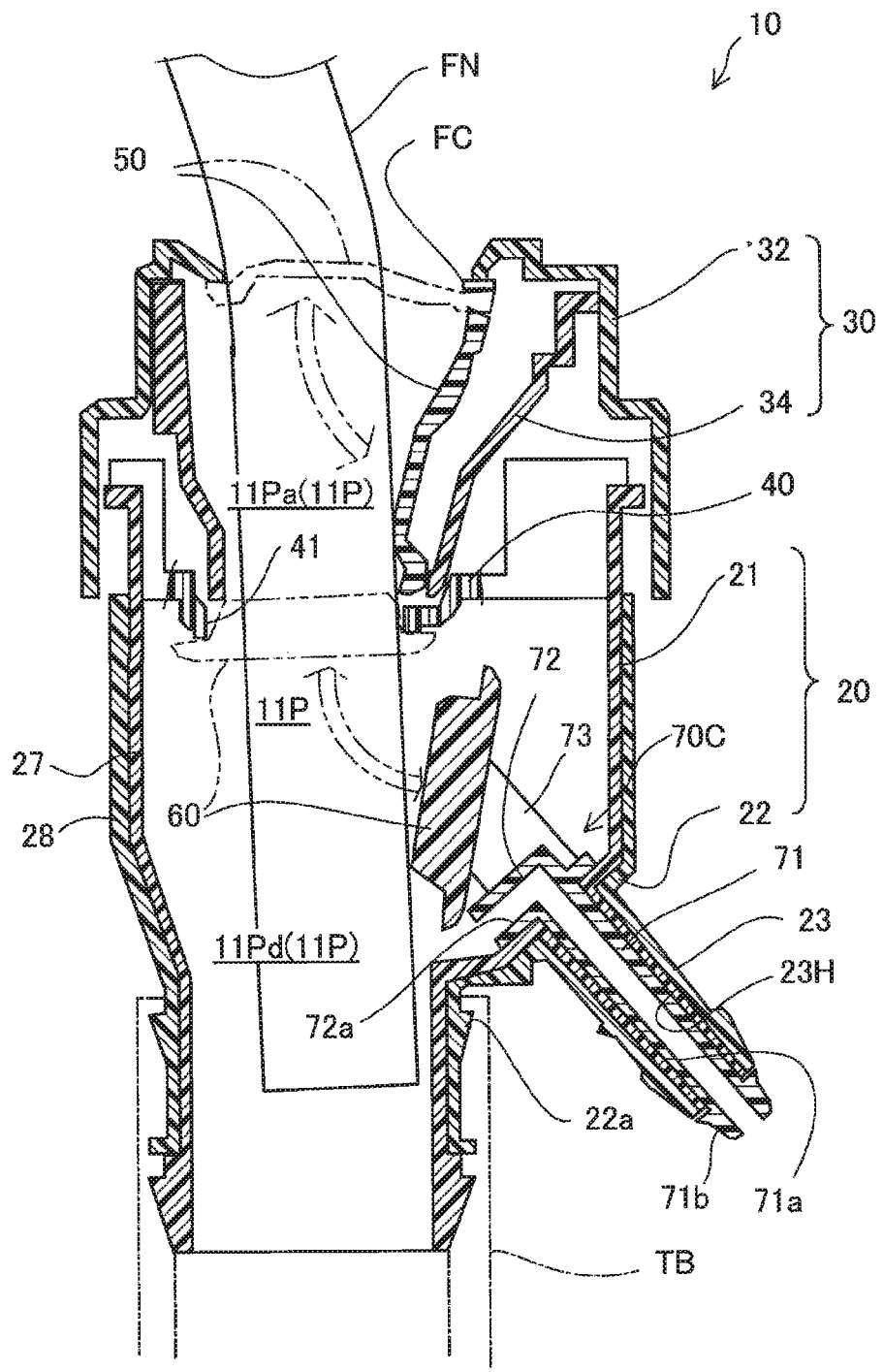
FIG. 7 is an explanatory diagram for illustrating a filler neck including a vapor introduction body according to a third modification, as viewed in cross-section in a longitudinal direction.
Figure 8:
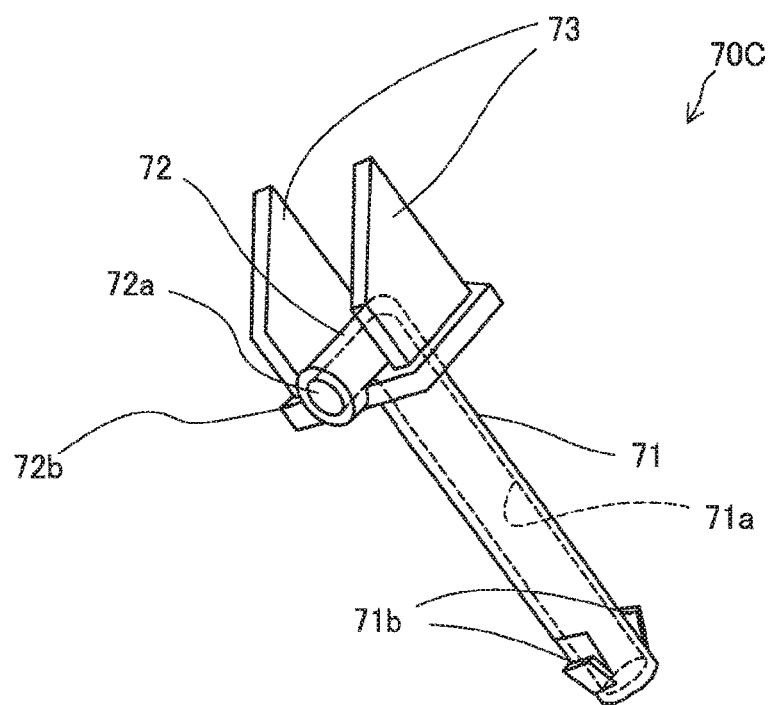
FIG. 8 is a schematic perspective view for illustrating the vapor introduction body according to the third modification.

FIG. 7 is an explanatory diagram for illustrating the filler neck 10 including a vapor introduction body 70C according to a third modification, as viewed in cross-section in a longitudinal direction. FIG. 8 is a schematic perspective view of the vapor introduction body 70C according to the third modification. In the filler neck 10 according to this modification, the vapor introduction body 70C advantageously determines the end of movement to the open side of the injection port opener/closer 60, which is pushed and opened by the fuel supply nozzle FN. In other words, the vapor introduction body 70C includes stopper plates 73 that sandwich the changing member 72 on an upper surface of the base plate 72b. The stopper plates 73 are a pair of plates that are held erect by the changing member 72 and have inclined end surfaces. The inclined surfaces of the stopper plates 73 abut against a rear surface of the injection port opener/closer 60 when the vapor introduction body 70C is inserted into and mounted to the through hole 23H of the fuel vapor port 23. This regulates the posture (open-end posture) of the injection port opener/closer 60 when the injection port opener/closer 60 is in a fully open state. A fuel supply device FS including the vapor introduction body 70C according to this modification can also achieve the effects described above. With the fuel supply device FS including the vapor introduction body 70C according to this modification, there is no need to provide a member configured to regulate the open-end posture of the injection port opener/closer 60 to the neck connecting portion 22 of the neck body 20. Therefore, the internal shape of the neck connecting portion 22 can be simplified, and mold manufacturing costs can be reduced.

Figure 9:
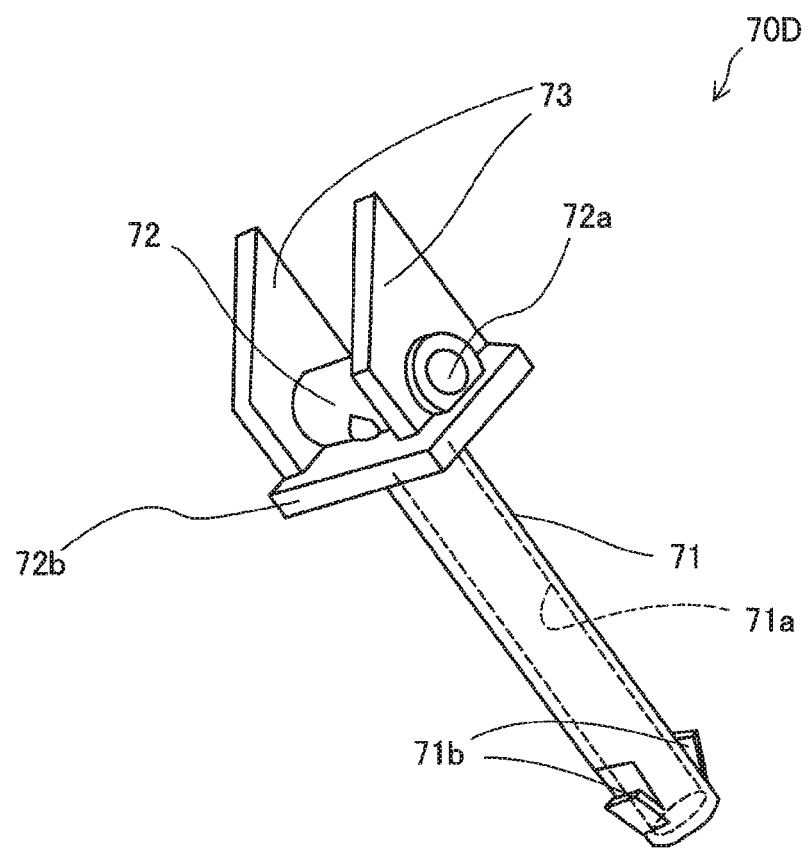
FIG. 9 is a schematic perspective view for illustrating a vapor introduction body according to a fourth modification.

FIG. 9 is a schematic perspective view of a vapor introduction body 70D according to a fourth modification. The vapor introduction body 70D according to this modification includes the stopper plate 73 on the base plate 72b, in addition to the changing member 72 as a linear duct integrally provided on the upper edge of the within-through-hole support 71. A fuel supply device FS including the vapor introduction body 70D according to this modification incorporated into the fuel vapor port 23 of the filler neck 10 illustrated in FIG. 7 can achieve an effect similar to that of the third modification, such as being able to introduce the fuel vapor to the fuel passage 11P from two discharge-side vapor passages 72a.

Figure 10:
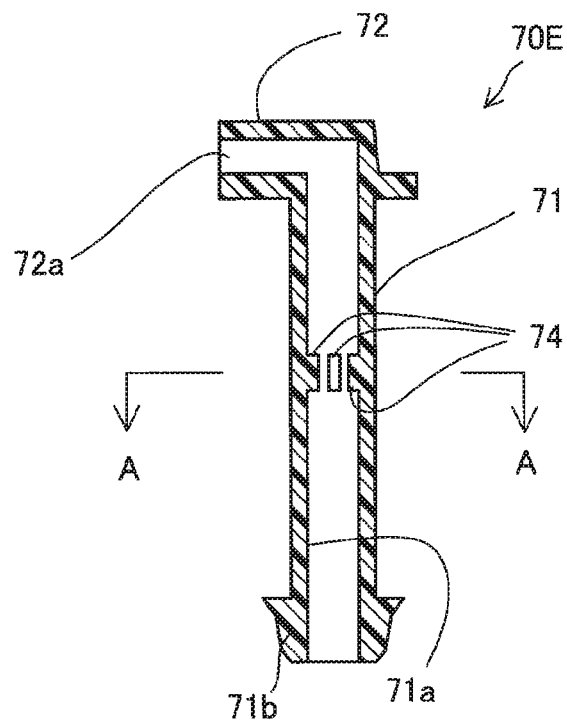
FIG. 10 is a longitudinal section view for illustrating a vapor introduction body according to a fifth modification.
Figure 10A:
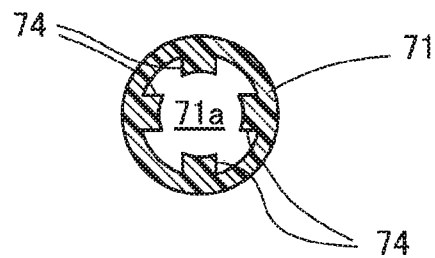
FIG. 10A is an end view for illustrating a cross section of a principle portion of the vapor introduction body according to the fifth modification in an enlarged manner.

FIG. 10 is a longitudinal section view for illustrating a vapor introduction body 70E according to a fifth modification. FIG. 10A is an end view for illustrating a cross section of a principle portion of the vapor introduction body 70E in an enlarged manner. The vapor introduction body 70E according to this modification includes an orifice 74 at one section of the vapor passage 71a. With a fuel supply device FS that includes the vapor introduction body 70E according to this modification incorporated into the fuel vapor port 23 of the filler neck 10 illustrated in FIG. 2, the fuel vapor can be introduced to the fuel passage 11P after the flow thereof has been rectified, and effects similar to those of the first embodiment can be achieved. A rectification valve or a mesh may be incorporated into the vapor passage 71a in place of the orifice 74.

This disclosure is not limited to the above-described embodiment and modifications, and may be implemented by various configurations within a scope that does not depart from the gist of the invention. For example, technical characteristics in the embodiments, examples, and modifications that correspond to those in aspects described in the Summary of the Invention may be replaced or combined as needed in order to solve part or all of the above-mentioned problem to be solved, or to achieve part or all of the above-mentioned effects. In addition, any technical characteristics not described as necessary herein may be deleted as necessary.

In the above-described embodiment, the vapor introduction body 70 is a molded article that integrates the within-through-hole support 71 and the changing member 72 through die molding or the like. However, the within-through-hole support 71 and the changing member 72 may be separate parts. For example, the within-through-hole support 71 may be engaged or fixed to a lower surface of the base plate 72b of the changing member 72. In this case, the changing member 72 is disposed on an opening side of the through hole 23H of the neck connecting portion 22, and the within-through-hole support 71 is inserted into the through hole 23H from another opening side of the through hole 23H, and then engaged or fixed to the changing member 72.

In the above-described embodiment, the vapor introduction body 70 is rotatable about the through hole axis in the through hole 23H of the fuel vapor port 23, but the vapor introduction body 70 may be in a state that does not allow rotation in the through hole 23H.

In the above-described embodiment, the vapor introduction body 70B illustrated in FIG. 6 or the vapor introduction body 70D illustrated in FIG. 9 changed the direction of flow of the fuel vapor to the two directions, left and right, illustrated in the figures. It is possible, for example, that the changing member 72 may be formed from a round duct bent into a V-shape, and integrating the within-through-hole support 71 at the bent section. Alternatively, the vapor introduction body 70 may be formed as a branched duct that branches off into three or more directions.

What is claimed is:

1. A fuel supply device, comprising:
a filler neck comprising:
   a nozzle guiding path that guides a fuel supply nozzle; and
   a fuel passage that is continuous to the nozzle guiding path on a downstream side of the fuel passage, through which fuel that has been discharged from the fuel supply nozzle passes;
a fuel vapor port located outside of the filler neck that has a through hole that communicates with the fuel passage; and
a vapor introduction body that guides the fuel vapor from the fuel vapor port to the fuel passage, wherein the vapor introduction body includes:
   a within-through-hole support that is inserted into and supported by the through hole, that includes a vapor passage along the through hole, and that is rotatable about a through hole axis in the through hole; and
   a changing member that faces an opening of the vapor passage on a side of the fuel passage, and that is configured to change a direction of flow of the fuel vapor that passes through the vapor passage to the side of the fuel passage.

2. The fuel supply device in accordance with claim 1, wherein the changing member changes the direction of flow of the fuel vapor to at least two directions.

3. The fuel supply device in accordance with claim 2, further comprising:
a slit that is formed on a side surface of an open end of the within-through-hole support of the vapor introduction body to divide a tip of the open end into a plurality of elastically deformable members, and an engagement hook that passes through and expands from the through hole provided in the fuel vapor port is provided outside of the plurality of members.

4. The fuel supply device in accordance with claim 1, further comprising:
a slit that is formed on a side surface of an open end of the within-through-hole support of the vapor introduction body to divide a tip of the open end into a plurality of elastically deformable members, and an engagement hook that passes through and expands from the through hole provided in the fuel vapor port is provided outside of the plurality of members.

5. A fuel supply device, comprising:
a filler neck comprising:
   a nozzle guiding path that guides a fuel supply nozzle; and
   a fuel passage that is continuous to the nozzle guiding path on a downstream side of the fuel passage, through which fuel that has been discharged from the fuel supply nozzle passes;
a fuel vapor port located outside of the filler neck that has a through hole that communicates with the fuel passage; and
a vapor introduction body that guides the fuel vapor from the fuel vapor port to the fuel passage, wherein the vapor introduction body includes:
   a within-through-hole support that is inserted into and supported by the through hole, and that includes a vapor passage along the through hole,
   a changing member that faces an opening of the vapor passage on a side of the fuel passage, and that is configured to change a direction of flow of the fuel vapor that passes through the vapor passage to the side of the fuel passage,
   a slit that is formed on a side surface of an open end of the within-through-hole support of the vapor introduction body to divide a tip of the open end into a plurality of elastically deformable members, and
   an engagement hook that passes through and expands from the through hole provided in the fuel vapor port is provided outside of the plurality of members.

6. A fuel supply device, comprising:
a filler neck comprising:
   a nozzle guiding path that guides a fuel supply nozzle; and
   a fuel passage that is continuous to the nozzle guiding path on a downstream side of the fuel passage, through which fuel that has been discharged from the fuel supply nozzle passes;
a fuel vapor port located outside of the filler neck that has a through hole that communicates with the fuel passage;
an injection port opener/closer configured to open/close the fuel passage; and
a vapor introduction body that guides the fuel vapor from the fuel vapor port to the fuel passage, wherein the vapor introduction body includes:
   a within-through-hole support that is inserted into and supported by the through hole, and that includes a vapor passage along the through hole,
   a changing member that faces an opening of the vapor passage on a side of the fuel passage, and that is configured to change a direction of flow of the fuel vapor that passes through the vapor passage to the side of the fuel passage, and
   on a side of the changing member of the vapor introduction body, a stopper plate configured to regulate an end position of movement toward an open direction of the injection port opener/closer when the fuel passage has opened.

7. The fuel supply device in accordance with claim 5, further comprising:
an injection port opener/closer configured to open/close the fuel passage; and
on a side of the changing member of the vapor introduction body, a stopper plate configured to regulate an end position of movement toward an open direction of the injection port opener/closer when the fuel passage has opened.

* * * * *